Sept. 20, 1971  A. GROSSBACH  3,605,338
SLIDING DOOR, PARTICULARLY FOR MOTOR VEHICLES
Filed Sept. 29, 1969  4 Sheets-Sheet 1
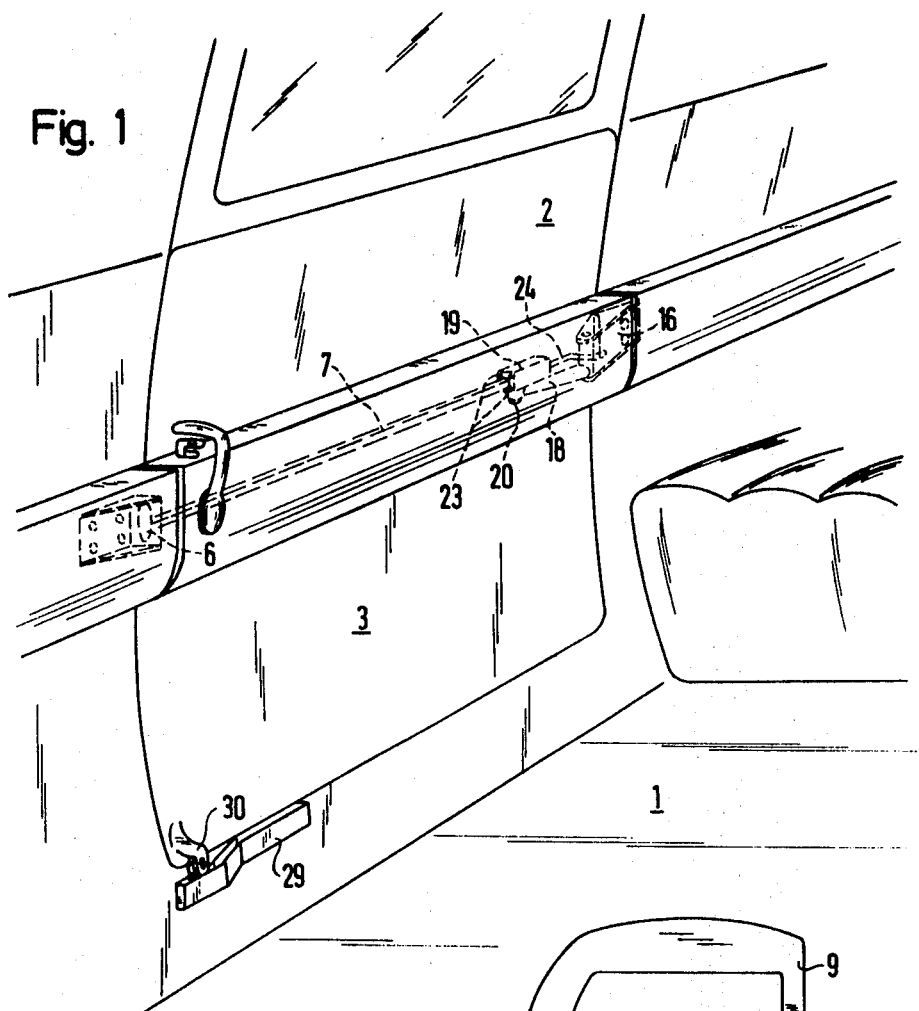
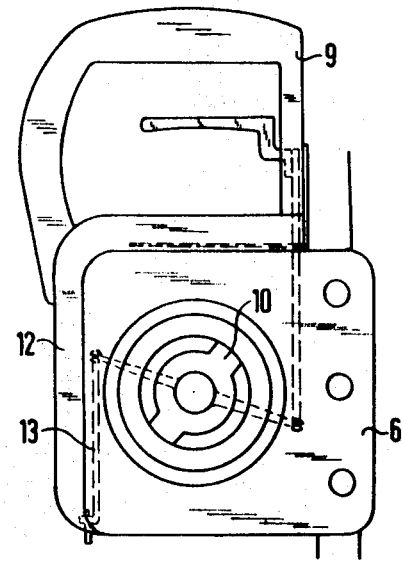
INVENTOR.
ALFRED GROSSBACH
BY Maslew and Toren
ATTORNEYS

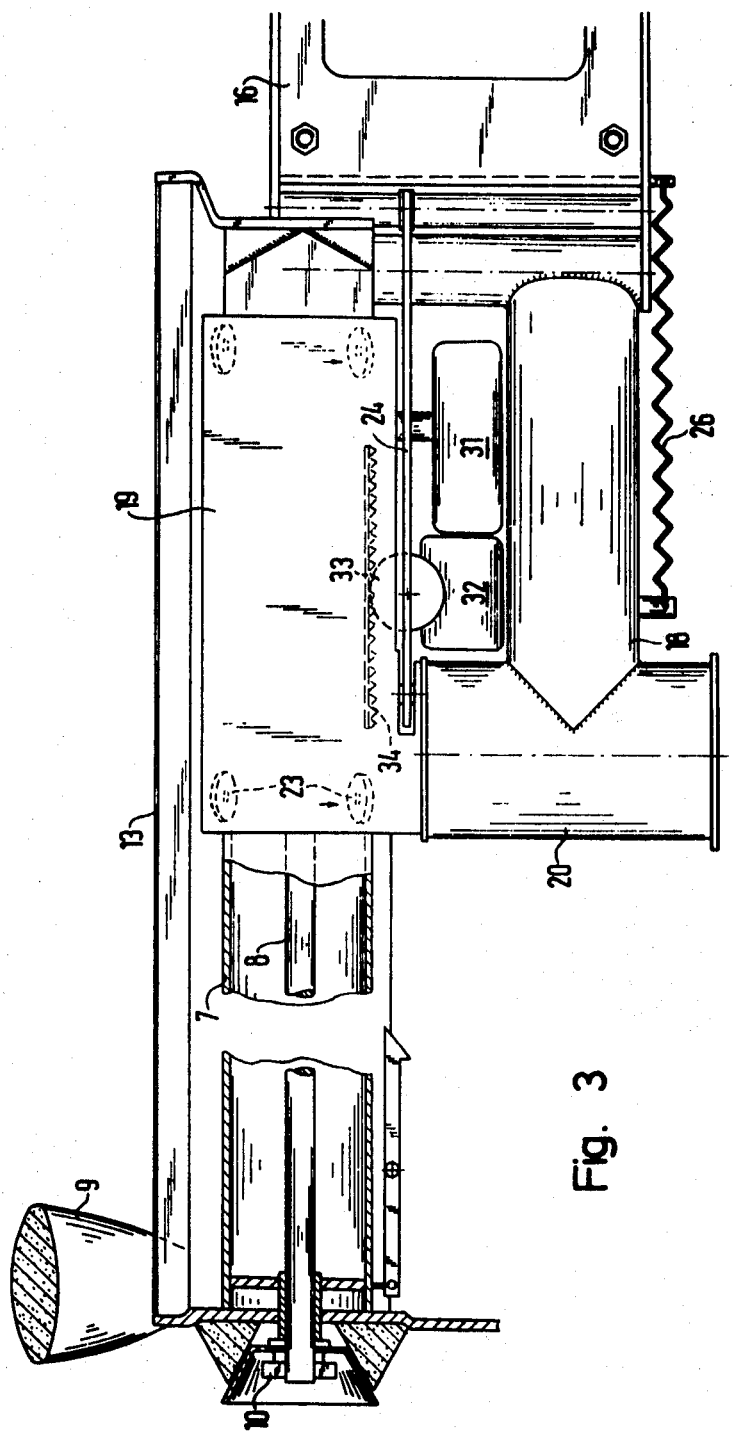

Sept. 20, 1971 A. GROSSBACH 3,605,338
SLIDING DOOR, PARTICULARLY FOR MOTOR VEHICLES
Filed Sept. 29, 1969 4 Sheets-Sheet 3

INVENTOR.
ALFRED GROSSBACH
BY
ATTORNEYS

United States Patent Office 3,605,338
Patented Sept. 20, 1971

3,605,338
SLIDING DOOR, PARTICULARLY FOR MOTOR VEHICLES
Alfred Grossbach, Tamm, Wurttemberg, Germany, assignor to Firma Lunke & Sohn, Witten (Ruhr), Germany
Filed Sept. 29, 1969, Ser. No. 861,770
Claims priority, application Germany, Sept. 30, 1968,
P 17 80 577.5
Int. Cl. E05d 15/10
U.S. Cl. 49—212      14 Claims

ABSTRACT OF THE DISCLOSURE

A sliding door for motor vehicles has a body comprising an outer skin and an inner lining. When opened, the door is first swingable into an intermediate position, by a carrier device including a carrier arm articulated on the vehicle body, for pivoting about a vertical axis, and the door is then slidable longitudinally of the vehicle body through the medium of a slide guide means. A single horizontally oriented slide guide extends the full length of the door on the inner lining and externally of the door body. The single slide guide is mounted on the door body by carrier parts. The slide guide has at least its upper and inner surfaces enclosed in a longitudinal cover which may be upholstered to serve as an arm rest, forming a continuation of an arm rest adjacent a vehicle seat. The slide guide encloses door lock operating means effective at both the front and rear edges of the door. A slide is movable along the slide guide on suitable rollers and is connected to a carrier arm forming part of the carrier device.

BACKGROUND OF THE INVENTION

In know sliding door arrangements for motor vehicles, the doors, in a first opening step, are swingable, with a relatively short radius, about vertical axes. A carrier device coacts with slide guiding means arranged substantially inside of the door body and forming an integral part thereof. These side guiding means are formed by hollow profiles or structural sections which, at least in part, open laterally, and this requires lateral openings in the body of the door.

In sliding door arrangements of this type, there results the disadvantages of heavy weight of the door and high manufacturing expense and, in addition, the disadvantage that, despite a considerable working space being occupied by the carrier device when the door is moved to its terminal opened position, a substantial portion of the door opening is still covered by the protruding door. Thus, a sufficiently wide entrance opening can be obtained only with a door which is swung out very far and a corresponding door opening.

Further than this, the slide guiding means, including partly opened hollow profiles or structural sections, are, to a considerable extent, exposed to ambient atmospheric conditions with the door in the open position. Consequently, due to rust formation and fouling, they are not capable of insuring consistent smooth functioning of the door over long periods of time.

Other known sliding door arrangements, with a plurality of carrier and slide devices, essentially have the same disadvantages but to an even greater extent.

SUMMARY OF THE INVENTION

This invention relates to sliding doors, particularly for motor vehicles, and, more particularly, to an improved sliding door of the type which, when opened, is first swung to an intermediate position and then slid longitudinally of the vehicle body.

The objective of the present invention is to improve a sliding door of the mentioned kind, and particularly to improve the carrier and slide arrangement for such a door so that a solid, safely working door is obtained, with minimum weight and minimum loss of working space and with a minimum of movable parts. The invention is also directed to such a sliding door in which all the fittings thereof, possibly including additional parts such as window lifters, door locks, or a motor drive, can be connected, as pre-mounted structural parts, with a prefabricated door body. A further object of the invention is to increase the safety of the car against accidents by reinforcing its side surfaces consisting essentially of sliding doors.

In accordance with the invention, these objectives are attained essentially by arranging a single horizontal slide guiding arrangement extending over the entire length of the door exteriorly of the door body and on the inner side of the door, and by mounting this guiding arrangement on the door body on corresponding projections of its outer sides or on carrier means provided on the guiding arrangement. A slide guiding arrangement of this nature can be manufactured as a separate structural part, together with a carrier device, and can be mounted on the door. The slide guiding means is designed as a closed hollow profile or structural shape, and thus is not only inherently protected to a considerable degree from deterioration due to atmospheric conditions but also imparts excellent rigidity to the door with a minimum increase in weight. Moreover, any weight increase is compensated by the fact that no special door frame is required. Inasmuch as the sliding door utilizes a single slide guiding arrangement, the door can be used with all types of vehicles.

In further accord with the invention, the slide guide has a cover extending over at least its upper side and toward the inner side of the vehicle. If the slide guide or slide guides are arranged in the center or upper areas of the door body, a particular feature of the invention provides that the cover is connected with the inner lining of the door body and is designed as an arm rest. Disposing the slide guide means in the arm rest, which latter is required in any event, excludes any reduction of space due to the slide guide means and also prevents damage to the slide guide means by surrounding influences.

As indicated above, the slide guide preferably has a non-circular cross section, and coacts with a mating guide head designed as a counterpart and arranged on the carrier arm for the door. An advantageous cross section of the slide guide is a regular square, with the slide guide oriented so that two of its opposite corner edges are in the same vertical plane. This has the advantage that the slide, particularly when the opposite edges thereof are rounded off, requires less space in a horizontal direction. The use of a hollow profile or structural member for the slide guide, in addition to saving weight, also facilitates disposing various devices, such as operating rods, door locks, and the like, within the slide guide.

In accordance with another feature of the invention, the carrier means comprises a carrier arm articulated on the car body and swingable about a vertical axis, and a guide head which is articulated on the free end of the carrier arm and also swingable about a vertical axis. The slide guide and the guide head preferably coact with each other through rolls. The design of the swiveling or pivoting means permits the use of a short guide head and also permits swiveling or pivoting of the latter in a manner such that, at least approximately, it lies in a common plane with the rear boundary of the door opening when the door is moved to the intermediate position. This design permits sliding the door over the entire door opening except for a minor amount corresponding to the width of the carrier arm.

In order to attain secure sealing of the door, it is desirable that the chassis and the door body overlap in the area of the front boundary of the door opening. This however, requires a path of movement, of the front edge of the door, which deviates from a circle. In accordance with the invention, such a path of movement of the front edge of the door is attained by controlling the swivel or pivot movement of the door, when opened or closed, by a guiding or steering member articulated on the car body and on the guide head asymmetrically to the carrier arm. With long doors, there may be provided, at the front end of the door and for supporting such a control, a guide arm directed downwardly and coating with a short lead-in guide arranged on the car body.

As a further feature of the invention, there is disposed, between the carrier arm and the car body, a spring acting on the carrier arm in the door opening direction. The carrier arm or the guide head or both, as well as a steering member, are constructed in a manner such that they abut in the swivel end position of the door through the medium of a stop arranged in spaced relation to the axes of rotation of the carrier arm, the guide head, or both and the steering member. The steering member thus blocks the swivel or pivot movement of the carrier arm so that the latter cannot be swung beyond a certain point during opening movement of the door.

Restriction of the swivel or pivot movement of the carrier arm can, of course, be attained in a different manner, for example, by providing stops on the carrier arm and on the guide head, as well as on the bolts or pivots forming their swivel axes, these stops becoming successively effective.

In order to hold the door in its terminal opening position, in accordance with the further invention a latch is provided at the front end of the door and this latch cooperates with a corresponding notch on the guide head when the door is moved to the terminal open position. Release of the latch is effected by the operating knob or handle for the door.

To facilitate operation of the door, the slide guide may be provided with transmission means for transmitting the driving force of a motor drive arranged outside the slide guide and preferably in or on the carrier arm of the carrier means.

Manufacture of the sliding door can be simplified, in accordance with the invention, by providing that the cover for the slide guide be provided with a surface approximately parallel to the window, and having suitable means, such as pivot pins or the like, provided for arranging or mounting a window lifting device which may be motor operated.

Speaking generally, the invention provides a sliding door which, with a minimum loss of working space and a minimum weight, increases the safety of the vehicle against accident, on the one hand, and permits the use of a premounted unit, comprising the slide guide, the carrier device and the control and operating means, on the other hand.

An object of the present invention is to provide an improved sliding door, particularly for motor vehicles.

Another object of the invention is to provide such a sliding door which is a solid, safely working door having a minimum weight and resulting in a minimum loss of working space, as well as requiring a minimum number of movable means.

A further object of the invention is to provide such a sliding door which increases the safety of the motor vehicle, against accidents, by reinforcing the side surfaces of the motor vehicle, which surfaces consist essentially of sliding doors.

Another object of the invention is to provide such a sliding door including a single horizontally oriented slide guide extending the full length of the door on the inner lining of the door body and externally of the door body.

A further object of the invention is to provide such a slide guide which can be manufactured as a separate structural part together with a carrier device, and which can be mounted on the door.

Another object of the invention is to provide such a slide guide having a cover extending over its upper side and toward the inner side of the vehicle, this cover being upholstered to constitute an arm rest or a continuation of an arm rest.

For an understanding of the principles of the invention, reference is made to the following description of typical embodiments thereof as illustrated in the accompanying drawings.

BRIEF DESCRIPTION OF THE DRAWINGS

In the drawings:

FIG. 1 is a perspective view of a sliding door embodying the invention;

FIG. 2 is an enlarged partial elevation view of parts at the front end of the door shown in FIG. 1;

FIG. 3 is a side elevation view, partly in section, corresponding to FIG. 2;

DESCRIPTION OF THE PREFERRED EMBODIMENTS

Figure 4:
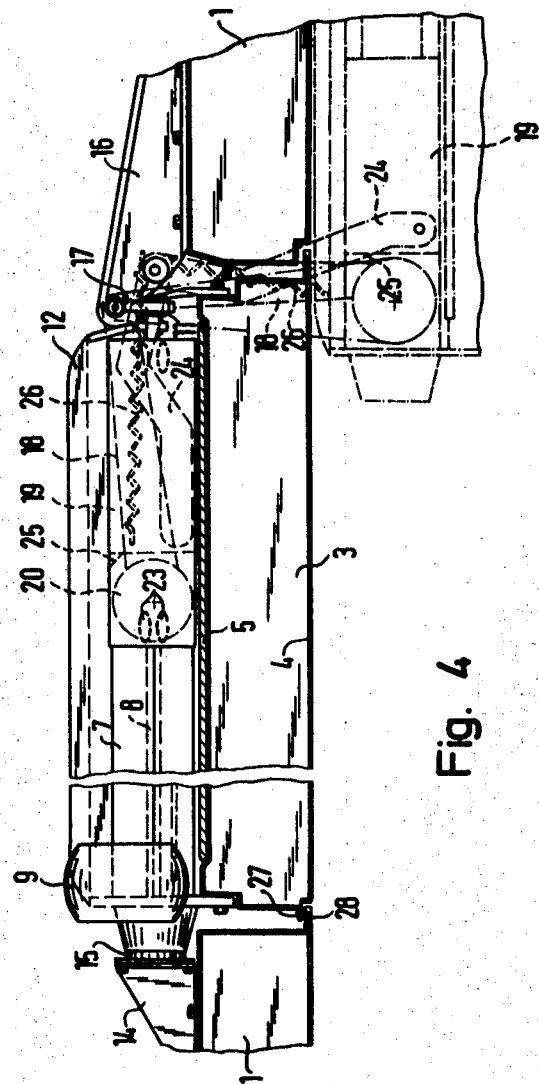
FIG. 4 is a top plan view partly in section, corresponding to FIG. 3.

Referring to FIG. 1, the door section or opening 2 of a vehicle body 1 is closed by a door 3, designed as a sliding door. The body of sliding door 3 essentially comprises an outer skin 4 and an inner lining 5, as best shown in FIG. 4. A slide guide 7 is mounted externally on the inner lining 5 of the door body by carrier parts 6.

Figure 5:
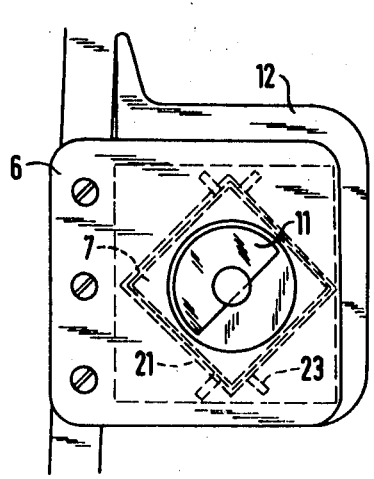
FIG. 5 is a partial elevation view corresponding to FIG. 2 but looking in the opposite direction.
Figure 6:
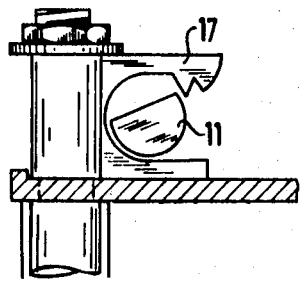
FIG. 6 is a transverse sectional view taken near the rear edge of the door as shown in FIG. 4.

As best seen in FIG. 5, in the embodiment of the invention illustrated in FIG. 1, slide guide 7 is designed as a regular square cross section hollow profile or structural member positioned so it is standing on one edge. Specifically, two opposite edges of slide guide 7 lie essentially in the same vertical plane. As best seen in FIGS. 1, 3 and 4, an actuating rod 8 is arranged in the interior of slide guide 7, and it is in operative connection with a door operating knob or handle 9 positioned exteriorly of slide guide 7, on the one hand, and with a door lock latch 10, at the front end of slide guide 7 and designed as a bayonet lock, and a hasp 11 at the rear end of the slide guide, on the other hand. Toward the top of the vehicle and the interior of the vehicle, slide guide 7 is covered by a cover 13 which, through the medium of upholstery 12, is designed as an arm rest. Cover 13 is connected with inner lining 5 of the door body and, in the area of its front end, carries the operating knob or handle 9 which is designed as a bow handle.

Door lock latch 10, together with its cooperating element 15 which is mounted on car body 1 by a brace or the like 14, serves to hold sliding door 3 in a locked condition. Hasp 11 coacts with a U-shaped link 17, also mounted on car body 1 through a brace or bracket 16, in a manner such that it prevents unintentional movement of a carrier device coacting with slide 7.

During opening of sliding door 3, after the two locking devices 10–15 and 11–17 have been released by operating knob 9, door 3 is first swung about a vertical axis into an intermediate position, through the medium of a carrying or carrier device essentially comprising a carrier arm 18 and a guide head 19, and the door is subsequently shifted longitudinally of the motor vehicle. Carrier arm 18 advantageously is a casting, and is supported in brace or bracket 16 for pivoting about a vertical axis. The free end of carrier arm 18 is provided with a bearing 20 for mounting guide head 19 on carrier arm 18, also for pivoting about a vertical axis.

In correspondence with the cross sectional shape of slide guide 7, guide head 19 is provided with a recess 21 in the form of a regular square standing on one edge, guide head 19 thus being essentially similar, in cross section, to slide guide 7. In the area of the upper and lower edges of slide guide 7, bearing or guiding rolls or pulleys 23 are provided in guide head 19, and these are perpendicular to the side surfaces 22 of slide guide 7 and are rotatable about axes parallel to the side surfaces 22. The length of guide head 19 corresponds approximately to the length of carrier arm 18, with carrier arm 18 being connected with guide head 19 adjacent its front end in a manner such that guide head 19 lies essentially behind the rear edge of door opening 2 when door 3 is swung. This permits movement of sliding door 3 over substantially the entire length of door opening 2.

While brace or bracket 16 is designed and arranged so that it extends into door opening 2 in an amount substantially equal to the width of carrier arm 18, carrier arm 18 is swingable into a position beyond a position perpendicular to the longitudinal center line of the vehicle. In its terminal position, carrier arm 18 is arrested by a coordinated control 24. As best seen in FIG. 4, control 24 is articulated on brace or brackets 16 and on guide head 19, in each instance for pivoting about a vertical axis and asymmetrically with respect to carrier arm 18. In addition, control 24, in its plane of movement, is angled repeatedly and in such a manner that it bears on carrier arm 18, through the medium of stop 25, as soon as carrier arm 18 is in its terminal door opening position.

Carrier arm 18 is secured against unintended or inadvertent back swinging from its terminal position by tension spring 26 which has one end engaging brace or bracket 16, and the other end engaging carrier arm 18, spring 26 biasing carrier arm 18 in the door opening direction. Control 24 simultaneously serves to control the swinging movement of door 3.

As particularly apparent in FIG. 4, the door body, with the door 3 closed, should have a border 27 thereon engage a border 28 on the car body. To assure exact interengagement between car body 1 and door 3, there is provided, in addition to the control of door 3 effected by control 24, and on a curved path deviating from a circle in the area of the front end of the door opening 2, a lead-in guide track 29 mounted on car body 1, as best seen in FIG. 1. Door 3 coacts with lead-in guide track 29 through the medium of a guide arm 30 arranged at the front end of door 3 and directed downwardly to engage track 29.

Within the scope of the invention, there may be provided a number of additional known devices for facilitating the operation, or simplifying the manufacture. For example, and as indicated in FIG. 3, an electric motor drive for opening or closing the door may be provided. In this case, electric motor 31, including gearing 32 driven thereby, is mounted on guide head 19 and coacts, through a gear wheel 33, with rack gear teeth 34 provided along the lower edge of slide guide 7.

While specific embodiments of the invention have been shown and described in detail to illustrate the application of the principles of the invention, it will be understood that the invention may be embodied otherwise without departing from such principles.

What is claimed is:

1. In a sliding door, particularly for motor vehicles, of the type including a door body having, in its upper region, a window cut-out and the lower region of which comprises substantially an outer skin and an inner lining, and which, when open, is initially swingable into an intermediate position by a carrier device including a carrier arm articulated on the vehicle body for pivoting about a vertical axis and is then slidable longitudinally of the vehicle body through the medium of a slide guide means: the improvement comprising, a single horizontally oriented slide guide extending the full length of the door on the inner lining externally of the door body beneath said window opening and mounted on said inner lining; said slide guide having a hollow profile; a guide head slidably engaged with said slide guide and pivoted on the free end of said carrier arm for pivoting about a vertical axis, said slide guide being movable longitudinally of said guide head; and a cover means covering said slide guide and said guide head toward the top of the vehicle and toward the interior of the vehicle; said cover means being connected with said inner door body lining and designed as an arm rest; said slide guide, said guide head and said carrier arm constituting the sole support of said door body during opening movement thereof and in the open position thereof.

2. In a sliding door, the improvement claimed in claim 1, in which said slide guide has a square cross section and is oriented so that two of the opposite edges lie in substantially the same vertical plane.

3. In a sliding door, the improvement claimed in claim 2, including rolling means rotatably mounted in said guide head and engaging the upper and lower sides of said slide guide.

4. In a sliding door, the improvement claimed in claim 1, including door locking means and a door locking operating rod positioned in said slide guide.

5. In a sliding door, the improvement claimed in claim 4, including motor operated door driving means arranged in said slide guide.

6. In a sliding door, the improvement claimed in claim 1, including a control member having one end pivoted to the body for pivoting about a first vertical axis and its other end pivoted to said guide head for pivoting about a second vertical axis, said first and second vertical axes being asymmetrical to said carrier arm; said control member guiding the swinging movement of said sliding door along a non-circular curved path.

7. In a sliding door, the improvement claimed in claim 1, including a downwardly directed guide arm at the front edge of said door; and a lead-in track on the car body engaged by said guide arm.

8. In a sliding door, the improvement claimed in claim 6, including a spring acting, between said carrier arm and the car body, in a door opening direction; and a stop limiting movement of said carrier arm and the parts associated therewith in the terminal position of said carrier arm; said stop being arranged in spaced relation to the pivot axes of said carrier arm, said guide head and said control member.

9. In a sliding door, the improvement claimed in claim 1, including first stops on pivot bolts constituting said vertical pivot axes, and second stops on said carrier arm and on said guide head successively engageable with said first stops.

10. In a sliding door, the improvement claimed in claim 1, including latch means mounted at a position fixed with respect to said car body and selectively engageable with said guide head in the terminal opening position of said sliding door.

11. In a sliding door, the improvement claimed in claim 2, including motor operated driving means arranged externally of said slide guide for operating said door; and force transmission means on said slide guide cooperable with said motor operated driving means.

12. In a sliding door, the improvement claimed in claim 11, in which said transmission means comprises rack teeth extending along the lower edge of said slide guide;

said motor operated driving means comprising an electric motor and a gear driven by said electric motor, said electric motor and said gear being mounted on said guide head and said gear engaging said rack teeth.

13. In a sliding door, the improvement claimed in claim 1, in which said cover member has a cover portion extending substantially parallel to a window opening in said sliding door; and means on said cover portion constructed and arranged for mounting of a window operating device.

14. In a sliding door, the improvement claimed in claim 1, in which said sliding door is prefabricated; said slide guide, said carrier arm and said guide head being constructed as a unit for mounting on said prefabricated sliding door and connection to the car body.

References Cited

UNITED STATES PATENTS

| | | | |
|---|---|---|---|
| 2,956,836 | 10/1960 | James et al. | 49—246X |
| 3,449,861 | 7/1969 | Lecomte | 49—362X |

FOREIGN PATENTS

| | | | |
|---|---|---|---|
| 939,546 | 10/1963 | Great Britain | 49—212 |

KENNETH DOWNEY, Primary Examiner

U.S. Cl. X.R.

49—216, 221; 296—153